United States Patent
Hattori et al.

(10) Patent No.: US 9,613,723 B2
(45) Date of Patent: Apr. 4, 2017

(54) COMPACT NUCLEAR POWER GENERATION SYSTEM

(71) Applicant: NIHON NATURE CELL CO., LTD., Chiyoda-ku, Tokyo (JP)

(72) Inventors: Sadao Hattori, Tokyo (JP); Osao Sumita, Tokyo (JP)

(73) Assignee: NIHON NATURE CELL CO., LTD., Tokyo (JP)

( * ) Notice: Subject to any disclaimer, the term of this patent is extended or adjusted under 35 U.S.C. 154(b) by 215 days.

(21) Appl. No.: 14/367,721

(22) PCT Filed: Dec. 19, 2012

(86) PCT No.: PCT/JP2012/008124
§ 371 (c)(1),
(2) Date: Sep. 24, 2014

(87) PCT Pub. No.: WO2013/094196
PCT Pub. Date: Jun. 27, 2013

(65) Prior Publication Data
US 2015/0049850 A1  Feb. 19, 2015

(30) Foreign Application Priority Data

Dec. 20, 2011 (JP) .................... 2011-278363

(51) Int. Cl.
*G21C 7/28* (2006.01)
*G21C 1/02* (2006.01)
(Continued)

(52) U.S. Cl.
CPC .............. *G21C 1/02* (2013.01); *G21C 1/026* (2013.01); *G21C 3/60* (2013.01); *G21C 7/28* (2013.01);
(Continued)

(58) Field of Classification Search
CPC . G21C 1/026; G21C 1/02; G21C 7/28; G21C 15/00; G21C 15/12; G21C 3/60; G21D 1/00
(Continued)

(56) References Cited

U.S. PATENT DOCUMENTS 5,420,897 A * 5/1995 Kasai .................. G21C 1/02
376/220
2010/0303193 A1  12/2010 Walters
(Continued)

FOREIGN PATENT DOCUMENTS

JP  06-051082  2/1994
JP  2005-049135  2/2005
(Continued)

OTHER PUBLICATIONS

Cha, "Development of a Supercritical CO2 Brayton Energy Conversion System Coupled With a Sodium Cooled Fast Reactor", Nuclear Engineering and Technology, vol. 41, No. 8, Oct. 2009.*
(Continued)

*Primary Examiner* — Jack W Keith
*Assistant Examiner* — Daniel Wasil
(74) *Attorney, Agent, or Firm* — K&L Gates LLP (57) ABSTRACT

A compact nuclear power generation system includes a reactor (3) comprising a core (2) which uses metal fuel containing either or both of uranium-235/238 and plutonium-239. A reactor vessel (1) houses the core (2). Metal sodium primary coolant (8) is heated by the core (2). A neutron reflector (9) maintains the effective multiplication factor of neutrons emitted from the core (2) at approximately one or more to bring the core into a critical state. The neutron reflector is movable from a lower part towards an upper part of the core. The heated metal sodium is supplied to a main heat exchanger (15) which is located outside the
(Continued)

reactor. A secondary coolant of supercritical carbon dioxide, which circulates through the main heat exchanger, is in heat exchange with the heated metal sodium. The heated secondary coolant drives a turbine (20). A power generator (21) can be operated by the driven turbine.

7 Claims, 4 Drawing Sheets

(51) Int. Cl.
      *G21C 15/00*     (2006.01)
      *G21D 1/00*     (2006.01)
      *G21C 3/60*     (2006.01)

(52) U.S. Cl.
      CPC ............... *G21C 15/00* (2013.01); *G21D 1/00* (2013.01); *Y02E 30/34* (2013.01); *Y02E 30/38* (2013.01); *Y02E 30/39* (2013.01)

(58) Field of Classification Search
      USPC ........ 376/211, 220, 221, 244, 351, 402, 458
      See application file for complete search history.

(56) References Cited

U.S. PATENT DOCUMENTS

| | | | |
|---|---|---|---|
| 2011/0206173 A1* | 8/2011 | Walters | G21C 1/02 376/361 |
| 2013/0083878 A1* | 4/2013 | Massie | G21C 1/22 376/110 |

FOREIGN PATENT DOCUMENTS

| | | |
|---|---|---|
| JP | 2007-107907 | 4/2007 |
| JP | 2008-191069 | 8/2008 |
| JP | 2008-292161 | 12/2008 |

OTHER PUBLICATIONS

Li, "Heat Exchangers for the Next Generation of Nuclear Reactors", Proceedings of ICAPP 2006, Jun. 4-8, 2006, Paper 6105.*
International Searching Authority, Translation of the Written Opinion of the International Searching Authority issued in connection with International Application No. PCT/JP2012/008124, dated Mar. 19, 2013. (4 pages).

* cited by examiner

COMPACT NUCLEAR POWER GENERATION SYSTEM

CROSS REFERENCE TO RELATED APPLICATIONS

The present application is a National Stage of International Application No. PCT/JP2012/008124 filed Dec. 19, 2012 and which claims priority to Japanese Patent Application No. JP2011-278363 filed Dec. 20, 2011, the entire contents of which are being incorporated herein by reference.

BACKGROUND

This invention relates to a nuclear power generation system and, more particularly, to a compact nuclear power generation system in which a cooling system is divided at least into a primary cooling system and a secondary one.

BACKGROUND ART

Heretofore, as a nuclear reactor used for a nuclear power generation system, there is known an indirect cycle nuclear reactor in which a turbine is run in rotation to generate electrical power by steam not contaminated by radiations. The nuclear reactor of this sort includes a steam generator and a heat exchanger between the first and second cooling systems.

It is observed that, in a loop type fast breeder reactor, aimed to construct a large size electrical power generation system, the heat in a primary sodium system (primary cooling system), heated on cooling the reactor core, is transmitted by an intermediate heat exchanger to a secondary sodium system (secondary cooling system). The heat of the secondary sodium system is further transmitted by an evaporator and a superheater to the water/steam system. In a tank type fast breeder reactor in which the reactor vessel is enlarged in size and an intermediate heat exchanger as well as a pump of a primary sodium system is housed in the reactor vessel, the heat in the primary sodium system is transmitted by the intermediate heat exchanger to a secondary sodium system and further the heat in the secondary sodium system is transmitted by a steam generator to a water/steam system.

The nuclear reactor used in the large size power generation system of this sort is provided with a reactor core including larger numbers of fuel rods assembled together. Each fuel rod is formed of fuel obtained on molding metal oxide, containing uranium-235 or plutonium-239 of a low heat transfer characteristic, in the form of a bar or a pellet, and larger numbers of these pellets are then stacked in a sheathing tube. In a reactor used in a large size nuclear reactor, scores of fuel rods are bundled together to form a fuel assembly of the fuel rods. About 200 of the fuel assemblies are aggregated together, and each of a plurality of control rods, used for controlling the rate of the fuel reaction, is arranged in-between two adjoining fuel assemblies. If, in a large size nuclear reactor, employing the control rods, the fuel rods become unable to operate due to, for example, failures of a control mechanism that controls the fuel rod positions, there is a risk of runaway of the nuclear reaction in the reactor core.

Furthermore in a nuclear reactor different than the fast breeder reactor, such as a pressurized light water reactor, the heat of the primary cooling water, heated on cooling the reactor core, is transferred by a steam generator to a water/steam system. In the nuclear reactor of this sort, control rods likewise are arranged in-between adjoining fuel assemblies within the reactor in order to control the reaction rate in the reactor core.

In an indirect cycle nuclear reactor, such as a pressurized light water reactor or a loop type fast breeder reactor, aimed to construct the above mentioned large size electrical power generation system, heat transfer between respective cooling systems is by steam generators or heat exchangers that are respectively different entities independent of one another or that are housed within respective different chambers and interconnected by piping. Hence, the cooling system in its entirety is complicated and bulky in size. In particular, in a fast breeder reactor, aimed at power generation, the primary coolant system, exploiting metal sodium as a coolant, is formed by larger numbers of loops, each connected to a plurality of loops of the secondary coolant system. Hence, the numbers of tubes, pumps, heat exchangers or steam generators are increased, with the result that the cooling system becomes complicated or bulky in size.

Furthermore, in a large size nuclear reactor, constituting a large size power generation system, in which the rate of the nuclear reaction in the reactor core is controlled by control rods arranged between neighbored fuel assemblies, the monitor system for control rods is required, thus complicating the structure of the reactor itself. Hence, the manufacturing cost of the nuclear reactor is drastically increased, while many crews as well as larger numbers of monitor equipment are needed for maintenance and management.

It is observed that a tank fast breeder reactor has been proposed to simplify and reduce the size of the cooling system. In the fast breeder reactor of this sort, intermediate heat exchangers or steam generators are still needed to circumvent the risk proper to sodium used for cooling the reactor core, while simplifying the structure or reducing the size of the cooling system may not be said to be sufficient.

There is thus a demand for further simplifying and reducing the size of the cooling system. To accomplish the objective, such a nuclear reactor disclosed in Patent Document 1 has been proposed.

CITATION LIST

Patent Literature

PTL1: WO03/007310

SUMMARY

Technical Problem

It is an object of the present invention to provide a compact nuclear power generation system which will enable the system including the nuclear reactor and the power generation system to be further reduced in size in its entirety.

It is another object of the present invention to provide a compact nuclear power generation system which is of the load follower type, safe and easy to control.

It is yet another object of the present invention to provide a compact nuclear power generation system which will enable the manufacturing cost as well as the cost for maintenance and management to be reduced.

Solution to the Problem

The compact nuclear power generation system according to the present invention has been proposed in order to accomplish the above objects, and includes a nuclear reactor, which in turn includes a reactor core, a reactor vessel containing the reactor core therein, a primary coolant that is formed of metal sodium charged into the reactor vessel and that is heated by the reactor core, and a neutron reflector mounted surrounding the reactor core. The neutron reflector operates to maintain the effective multiplication factor for neutrons radiated from the reactor core at about unity or higher to set the reactor core to the critical state. The reactor core includes a plurality of fuel rods each formed of a metal fuel containing one or both of uranium-235/238 and plutonium-239. A certain number of the fuel rods are sealed within each of a plurality of sheathing tubes. It is observed that uranium-238 contained in the uranium fuel absorbs neutrons and generates plutonium-238 as the nuclear reactor is maintained in operation.

In this compact nuclear power generation system, the main heat exchanger is installed outside the nuclear reactor. The primary coolant, heated by the primary coolant, is supplied to the main heat exchanger via a conduit. The secondary coolant, heated by heat exchange with the primary coolant, is circulated in the main heat exchanger. According to the present invention, supercritical carbon dioxide is used as the secondary coolant. The compact nuclear power generation system includes a turbine, driven by the secondary coolant, heated by the main heat exchanger, and a generator run in operation by the driving of the turbine.

The neutron reflector, mounted surrounding the reactor core, is of a height smaller than the height of the reactor core, and is moved by a movement mechanism in a direction from a lower side towards an upper side of the reactor core.

The reactor core of the nuclear reactor is formed by a collection of a plurality of fuel rods that are formed by a metal fuel and that are sealed in a sheathing tube formed of ferrite-based stainless steel or chromium molybdenum steel. The metal fuel is formed of an alloy composed of zirconium, uranium-235/238 and plutonium-239 or an alloy composed of zirconium and one of uranium-235/238 and plutonium-239.

The reactor vessel is formed as a cylinder having a diameter not larger than 2 m and a height not larger than 12 m, and the reactor core housed within the reactor vessel is formed by a collection of fuel rods each having a diameter of 5 to 15 mm and a collective length not larger than 2 m.

The present system further includes a pump that circulates the primary coolant, charged into the reactor vessel, in a direction from the reactor vessel to the main heat exchanger.

The present system further includes a cooler that drives the turbine to cool the secondary coolant discharged from the turbine, a compressor that compresses the secondary coolant from the turbine, and a recycling heat exchanger. The recycling heat exchanger is supplied with the secondary coolant discharged from the turbine and with the secondary coolant compressed by the compressor. The recycling heat exchanger heats the secondary coolant compressed by the compressor by the secondary coolant supplied from the turbine to return the heated secondary coolant to the main heat exchanger. The compressor, compressing the secondary coolant, is driven by the turbine.

Advantageous Effect of the Invention

According to the present invention, the nuclear reactor is constituted without using the control rods that control the rate of the nuclear reaction, such as to reduce the size of the nuclear reactor. In addition, supercritical carbon dioxide is used as the secondary coolant heated by the nuclear reactor to drive a turbine, thereby reducing the size of the driving system of the power generation system including the turbine and also reducing the size of the nuclear power generation system in its entirety.

Furthermore, in the nuclear reactor, having the compact nuclear power generation system, according to the present invention, metal sodium is used as the primary coolant. Thus, in a case that the nuclear reactor is performing load follower driving in which a power generation output is varied to follow variations in the power consumption by the load connected to the power generation system, it becomes possible to automatically control the reactivity of the nuclear fuel so as to follow variations in the power consumption by the load, thus enabling an automatic operation of the power generation system.

Additionally, according to the present invention, the neutron reflector is formed to a height smaller than the height of the fuel assembly, and is carried for movement from the lower to the upper side of the fuel assembly. The neutron reflector is thus moved from the portion of the fuel assembly where the nuclear fuel has been consumed to its portion where the nuclear fuel has not been consumed. Hence, the nuclear reaction may be sustained for a prolonged time as control is managed of the reactivity of the nuclear fuel.

According to the present invention, the reactor vessel has a diameter not larger than 2 m and a height not larger than 12 m, while the reactor core, housed in the reactor vessel, is formed by an assembly of fuel rods each having a diameter of 5 to 15 mm and a collective length not larger than 2.5 m. Hence, the nuclear reactor may be reduced in size.

According to the present invention, the primary coolant, charged into the reactor vessel, is circulated using a pump. Hence, metal sodium, constituting the primary coolant, may positively be circulated.

According to the present invention, the primary coolant, heated within the nuclear reactor, is supplied to a heat exchanger provided outside the nuclear reactor so as to exchange heat with the secondary coolant formed of supercritical carbon dioxide. It is thus possible to provide the circulation system, comprised of the heat exchanger and the turbine, outside the nuclear reactor, thus assuring facilitated maintenance and inspection of the power generation system.

Since the circulation channel, in which the secondary coolant, driving the turbine, is circulated, is formed as a closed loop, the power generation system may further be reduced in size, while loss of the secondary coolant may be reduced.

By using supercritical carbon dioxide as the secondary coolant, the turbine, driving the generator, may further be reduced in size. Viz., the turbine may be driven at a high efficiency because supercritical carbon dioxide has a density sufficiently higher than e.g., water.

By using supercritical carbon dioxide as the secondary coolant, it is possible to prevent accidents, such as explosions, which might be caused by reaction of sodium with water, even if the secondary coolant contacts metal sodium of the primary coolant, thus assuring improved system safety.

Additional features and advantages are described herein, and will be apparent from the following Detailed Description and the figures.

DETAILED DESCRIPTION

Figure 1:
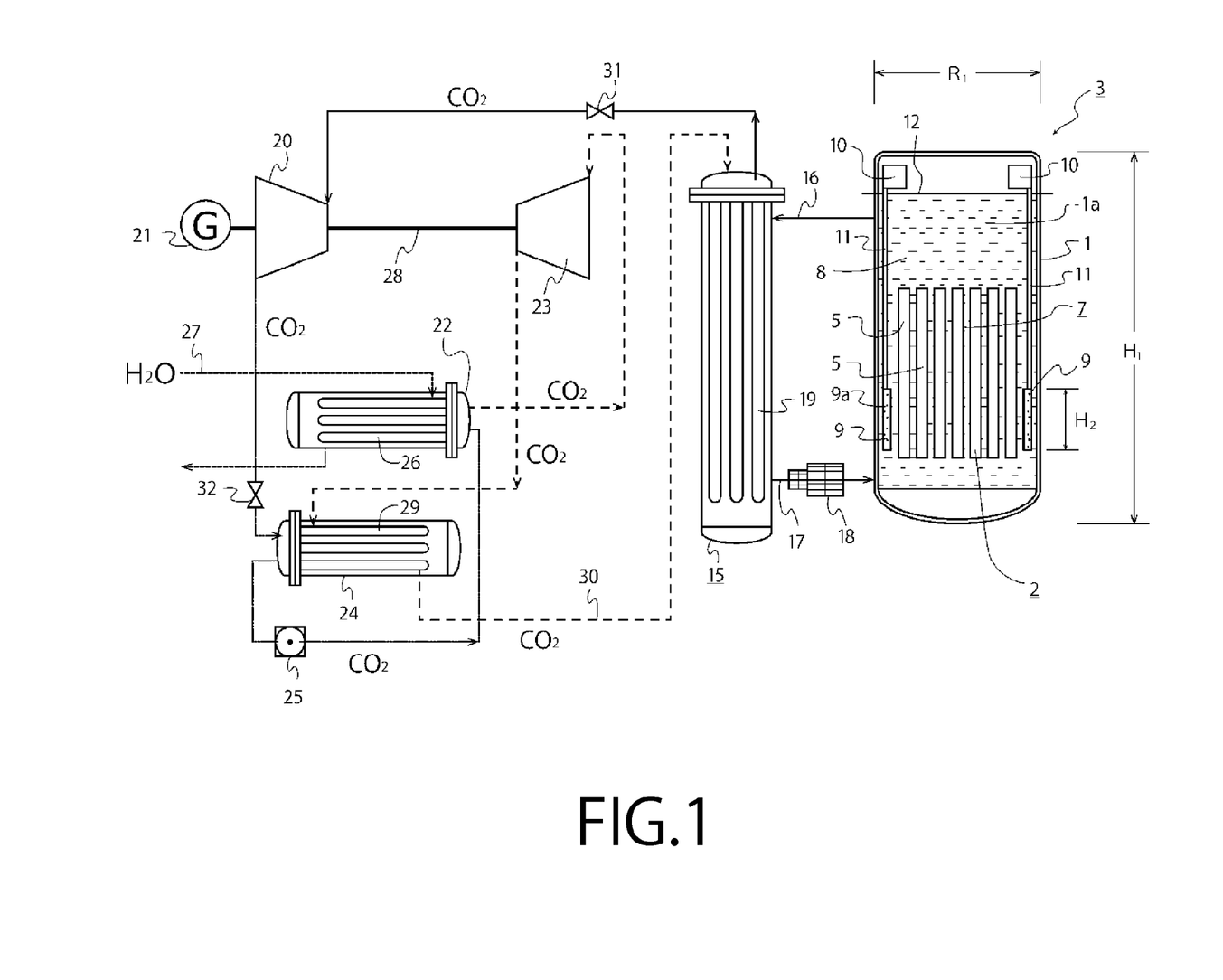
FIG. 1 is a schematic view showing a structure of a compact nuclear power generation system according to an embodiment of the present invention.

Referring to FIG. 1, a compact nuclear power generation system according to the present invention includes a nuclear reactor 3 comprised of a reactor core 2 loaded within a reactor vessel 1.

In an embodiment illustrated, the reactor vessel 1 is cylindrically-shaped, with a diameter R1 and a height H1 of the cylinder being not larger than 2 m and not larger than 12 m. More specifically, the reactor vessel 1 is cylindrically-shaped, with the diameter R1 of the cylinder being 1.5 m and the height H1 being 3 m.

Figure 2:
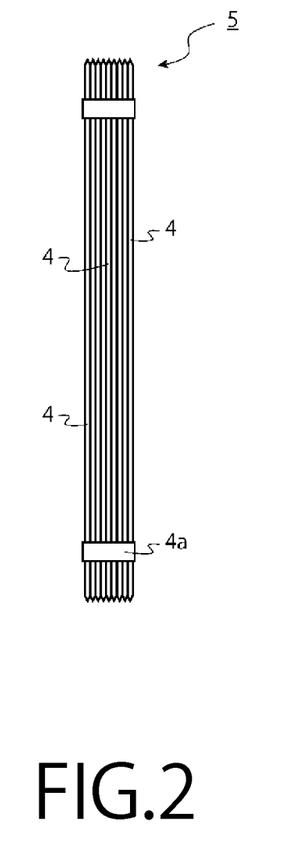
FIG. 2 is a side view showing fuel rods used in the nuclear reactor according to the present invention.

Referring to FIG. 2, a reactor core 2, loaded within the reactor vessel 1, is constituted by a fuel assembly 5, and includes a plurality of fuel rods 4 bundled together, as shown in FIG. 2. Each fuel rod is comprised of metal fuel containing uranium-235/238 and plutonium-239, with the metal fuel being enclosed within a sheathing tube.

The metal fuel used in the present embodiment is formed of an alloy of zirconium, uranium-235/238 and plutonium-239, and is in the form of a bar with a diameter of 5 to 15 mm and a height of not lesser than 10 cm. This metal fuel is sealed within a sheathing tube of ferrite-based stainless steel to constitute the fuel rod 4.

The sheathing tube, in which the metal fuel is sealed, is formed as an elongated cylinder having a diameter of 5 to 15 mm and a length of not larger than 2.5 m. Hence, the fuel rod 4, formed using the sheathing tube, is in the form of a column with a diameter about equal to 9 mm and a length about equal to 1.5 m.

Figure 3:
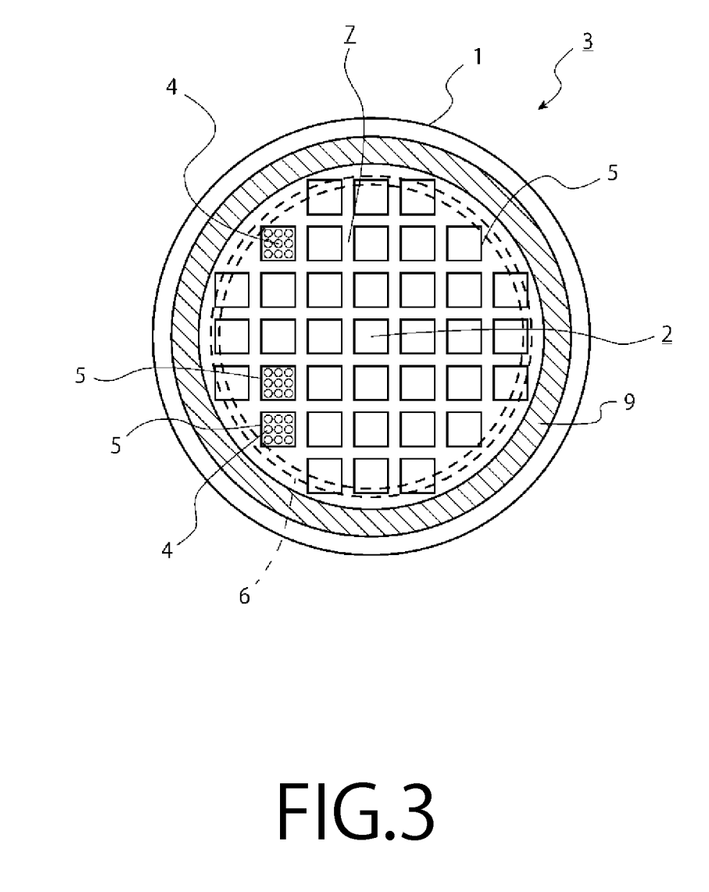
FIG. 3 is a transverse cross-sectional view showing an inner part of the nuclear reactor.

About 50 of the fuel rods 4, each comprised of a metal fuel sheathed within the sheathing tube, are bundled together by a fastener band 4a, as shown in FIG. 2, to form the sole fuel assembly 5. About 40 of the fuel assemblies 5 are unified together to form a fuel assembly structure 7. These about 40 of the fuel assemblies 5 are unified together by a core barrel 6, provided around the outer periphery of the fuel assemblies, as shown in FIG. 3. The fuel assembly structure 7 is loaded within the reactor vessel 11 to constitute the reactor core 2.

The fuel assembly structure 7 is formed by the fuel rods 4, each about 1.5 m long, and hence is about 1.5 m long approximately equal to the length of the fuel rod 4. Since the fuel assembly structure 7, thus approximately 1.5 m in height, is loaded on the bottom side of the reactor vessel 1, having the height H1 of 3 m, there is left a space 1a of 1 to 1.2 m on an upper side of the reactor vessel 1.

It is noted that metal fuel may be formed of an alloy of zirconium with one of uranium-235/238 and plutonium-239.

The sheathing tube, within which the metal fuel is sheathed to form the fuel rod 4, may be formed of chromium or molybdenum steel to a tube shape.

A primary coolant 8, heated by heat generated by the reactor core 2 being set to a critical state, is charged within the reactor vessel 1. In the present embodiment, metal sodium is used as the primary coolant 8.

A neutron reflector 9 is arranged on an outer peripheral side of the fuel assembly structure 7 formed by a plurality of the fuel assemblies 5 unified together. The neutron reflector 9 is mounted surrounding the fuel assembly structure 7 as a constant spacing is maintained between the neutron reflector and the fuel assembly structure 7. The neutron reflector 9 reflects neutrons radiated from the fuel rods 4 constituting the reactor core 2 to control the neutron density within the reactor vessel 1 such as to maintain the effective multiplication factor for neutrons radiated from the fuel rods 4 at approximately unity or higher in order to set the reactor core to the critical state.

In the nuclear reactor 3 according to the present invention, the neutron reflector 9 reflects the neutrons, radiated from the fuel rods 4, towards the reactor core 2 to control the neutron density in the reactor vessel 1 to set the critical state of the reactor vessel 1. Therefore, only a minor quantity of fuel suffices, thus reducing the size of the nuclear reactor 3.

In the present embodiment, the neutron reflector 9 is formed e.g., of stainless steel capable of reflecting the neutrons radiated from the fuel rods 4. The neutron reflector 9 is formed as a double-walled annular body made up of an inner tube and an outer tube arranged at a preset interval in-between. Within the inner side of the neutron reflector 9, there are charged fine particles of graphite 9a having a neutron reflecting capability. The neutron reflector 9, thus charged in its inner side with the fine particulate graphite 9a, reflects neutrons, radiated from the fuel rods 4, surrounded by the neutron reflector 9, back towards the fuel rods 4. The neutron reflector also causes neutrons, transmitted through its reflective inner wall member, so as to impinge on the fine graphite particles so that the neutrons are thereby reflected and returned to the inside of the reactor core.

It is observed that a carbonaceous material, such as graphite, may absorb only a minor amount of neutrons, while having a relatively large cross-sectional area as a target for neutron impingement. For this reason, the material has a high probability of reflection and hence is used as a neutron reflection material in order to take advantage of the characteristic of high reflection probability proper to the fine particulate graphite 9a.

It is observed that the neutron reflector 9 is formed as a cylinder of a dimension such that, when the neutron reflector is placed around the fuel assembly structure 7 within the reactor vessel 1, an interval or a gap of 1 to 10 cm, preferably 1 to 2 cm, will be created between the outer peripheral surface of the fuel assembly structure 7 and the inner peripheral surface of the neutron reflector.

It is observed that, should there be not provided the neutron reflector 9 around the fuel assembly structure 7, the neutrons radiated from the metal fuel is lowered in density, and hence the critical state may not be maintained. On the other hand, as the reactor core 2 is brought to the critical state to undergo the reaction, uranium-235 or plutonium-239, contained in the metal fuel, is consumed.

Thus, the neutron reflector 9 is of a height H2, which is one-half or less of the length of the fuel rods 4 loaded within the reactor vessel 1, and is carried for movement in the up-and-down direction of the fuel assembly structure 7. The neutron reflector 9 is moved gradually from the portions of the fuel rods 4 where the metal fuel of the fuel rods has been consumed to those of the fuel rods where the metal fuel has not been consumed, thereby maintaining the critical state of the reactor core 2 for prolonged time.

In the present embodiment, the neutron reflector 9 is of a height H2 about equal to 40 cm. The neutron reflector 9 is arranged parallel to the reactor core 2, as shown in FIG. 1, and carried by a driving shaft 11 which is run in rotation by a rotary driving mechanism 10. The neutron reflector is driven into movement along the height of the reactor core 2 by the driving shaft 11 being run in rotation.

The driving shaft 11 is passed through a partitioning wall member 12 configured for delimiting and hermetically sealing an upper part of the reactor vessel 1. The driving shaft 11 is connected to the rotary driving mechanism 10, arranged on top of the partitioning wall member 12, and is driven to perform revolutions by the operation of the rotary driving mechanism 10, whereby the neutron reflector 9 may be moved in the up-and-down direction along the reactor core 2.

The compact nuclear power generation system of the present invention includes a main heat exchanger 15, which is supplied with the primary coolant 8, heated within the nuclear reactor 3, and within which is circulated a secondary coolant heated by heat exchange with the primary coolant 8. The main heat exchanger 15, provided outside the nuclear reactor 3, is connected to the nuclear reactor 3 via conduits 16, 17, constituting a flow channel for the primary coolant 8 charged into the reactor vessel 1.

The primary coolant 8, heated within the reactor vessel 1, is delivered to the main heat exchanger 15 via the supply side conduit 16. The primary coolant 8, delivered to the main heat exchanger 15, flows through the inside of the main heat exchanger 15 so as to be then returned into the reactor vessel 1 via the return side conduit 17. That is, the primary coolant 8, charged into the reactor vessel 1, flows through a closed loop circulation channel interconnecting the reactor vessel 1 and the main heat exchanger 15.

Within the circulation channel for the primary coolant 8, there is provided a pump 18 configured for accelerating the convection of the primary coolant 8 of the primary coolant 8 heated within the reactor vessel 1. The pump 18 is provided halfway on the circulation channel within which the primary coolant 8 exiting the main heat exchanger 15 flows towards the reactor vessel 1. By providing the pump 18, configured for accelerating the convection of the primary coolant 8, it is possible to permit smooth circulation of the primary coolant within the circulation channel extending from the reactor vessel 1 to the main heat exchanger 15, even though metal sodium of higher viscosity is used as the primary coolant 8.

Since electrically conductive metal sodium is used as the primary coolant 8, an electromagnetic pump is used as the pump 18. The electromagnetic pump is configured so that, when metal sodium flows through a circulation channel, the electric current is sent to metal sodium, with the current then co-acting with the magnetic field from the electromagnetic pump 18 to produce a force in the flow direction of metal sodium to promote its circulation.

A heat transfer tube 19, within which circulates the secondary coolant, is provided within the main heat exchanger 15. When flowing through the inside of the heat transfer tube 19, the secondary coolant is heated by thermal contact with the heated primary coolant 8 delivered into the inside of the main heat exchanger 15. In the subject embodiment, supercritical carbon dioxide is used as the secondary coolant.

The compact nuclear power generation system according to the present invention includes a turbine 20, driven by supercritical carbon dioxide, as the secondary coolant, heated by the main heat exchanger 15, and a generator 21 which is run in rotation by the turbine 20 being run in operation.

The present system further includes a cooler 22, used for cooling supercritical carbon dioxide, which has driven the turbine 20, a compressor 23, used for compressing the supercritical carbon dioxide, cooled by the cooler 22, and a recycling heat exchanger 24. The recycling heat exchanger is supplied with supercritical carbon dioxide, discharged from the turbine 20, and with supercritical carbon dioxide compressed by the compressor 23. The supercritical carbon dioxide, compressed by the compressor 23, is heated by the supercritical carbon dioxide supplied from the turbine 20 so as to be then returned to the main heat exchanger 15.

There is also provided a pump for circulation 25 by means of which the supercritical carbon dioxide, used for driving the turbine 20 and then supplied to the recycling heat exchanger 24, is delivered to the cooler 22.

The supercritical carbon dioxide, delivered from the recycling heat exchanger 24 to the cooler 22, flows through the inside of a heat transfer tube 26 provided within the cooler 22. The supercritical carbon dioxide, flowing through the inside of the heat transfer tube 26, is delivered to the cooler 22 so as to be cooled by having thermal contact with cooling water ($H_2O$) supplied to the cooler 22 via a cooling water conduit 27.

The supercritical carbon dioxide, cooled by the cooler 22, is delivered to and compressed by the compressor 23. It is observed that the compressor 23 is connected via a connecting shaft 28 to the turbine 20 and is run in operation by the driving of the turbine 20.

The supercritical carbon dioxide, compressed by the compressor 23, is delivered to a heat transfer tube 29 provided within the recycling heat exchanger 24. The supercritical carbon dioxide, delivered to the heat transfer tube 29 provided within the recycling heat exchanger 24, is heated by having thermal contact with the high-temperature supercritical carbon dioxide delivered from the turbine 20 to the inside of the recycling heat exchanger 24. The compressed supercritical carbon dioxide, heated by the recycling heat exchanger 24, is returned via a return channel 30 to the heat transfer tube 19 provided within the main heat exchanger 15.

The compressed supercritical carbon dioxide, heated by the main heat exchanger 15, drives the turbine 20, and is then circulated to the cooler 22, thence to the compressor 23, thence to the recycling heat exchanger 24 and thence to the main heat exchanger 15. During this time, the supercritical carbon dioxide is subject to heating, expansion and compression in a repetitive manner to drive the turbine 20 to actuate the generator 21 for power generation.

The operation of the compact nuclear power generation system will now be detailed further. In an initial state of the compact nuclear power generation system, prior to start of an operation, the neutron reflector 9 is positioned in a space 1a in an upper part of the reactor vessel 1.

To start the operation, the rotary driving mechanism 10 is driven to move the neutron reflector 9 to a lower part of the reactor vessel 1, so that the neutron reflector will face the lower part of the reactor core 2, as shown in FIG. 1. When the neutron reflector 9 faces the reactor core 2, the neutrons radiated from the fuel rods 4 of the fuel assembly structure 7 are reflected by the neutron reflector 9 to raise the neutron density within the reactor core 2. With the effective multiplication factor for neutrons, radiated from the fuel rods 4, equal to about unity or higher, the reactor core 2 is in a critical state.

With the reactor core 2 in the critical state, the fuel in the fuel rods 4 is reacted and heated, thus heating the primary coolant 8 charged into the reactor vessel 1. The heated primary coolant 8 convects within the reactor vessel 1 so as to be supplied to the main heat exchanger 15 via supply side conduit 16. The primary coolant delivered to the main heat exchanger 15 comes into thermal contact with the heat transfer tube 19 provided in the main heat exchanger 15 to heat the secondary coolant circulated within the heat transfer tube 19. At this time, the primary coolant 8 that heated the secondary coolant is circulated from the main heat exchanger 15 through the inside of the reactor vessel 1 as it is accelerated in its flow movement by the pump 18 provided halfway in the return side conduit 17.

According to the present invention, the supercritical carbon dioxide is used as the secondary coolant, while metal sodium is used as the primary coolant 8 for heat exchange in the main heat exchanger 15. It is thus possible to positively circumvent the risk of, for example, explosions, even though the heat transfer tube 19, for example, is damaged such that the high-temperature primary coolant 8 comes into direct contact with the secondary coolant.

If heated to an order of ca. 600° C. and contacted in this state with $CO_2$, metal sodium undergoes a chemical reaction. However, if such chemical reaction should take place, simply sodium carbonate and carbon, as such, are generated, as indicated by the following formula:

$$4Na + 3CO_2 \rightarrow 2Na_2CO_3 + C$$

while there is no risk of accidents, such as explosions, which might take place on reaction with water.

It is observed that, when in a critical state, the reactor core 2 of the nuclear reactor 3 is at a temperature of 600 to 800° C., thus heating the primary coolant 8 within the reactor vessel 1. When heated to a temperature of ca. 500 to 750° C., due to heating in the reactor core 2, the primary coolant 8 is delivered to the main heat exchanger 15 as it is circulated by the pump 18. The primary coolant then undergoes heat exchange with the supercritical carbon dioxide, flowing through the heat transfer tube 19, provided within the main heat exchanger 15, thus heating the supercritical carbon dioxide to ca. 450 to 700° C.

It is observed that the supercritical carbon dioxide, flowing through the inside of the main heat exchanger 15, has been compressed by the compressor 23 to 12 to 20 MPa.

If injected to the turbine 20 provided within an ambient temperature normal pressure air, the supercritical carbon dioxide, heated by the main heat exchanger 15, is precipitously expanded in volume, as it is decompressed and cooled, so as to flow within the turbine 20, thus causing its revolutions. With the turbine 20 run into rotation, the generator 21 is run into operation to generate electric power.

It is observed that, when injected into the turbine 20, provided in atmospheric air, the supercritical carbon dioxide, heated to 450 to 700° C., is cooled to ca. 350 to 500° C. as it is decompressed to ca. 8.0 to 10 MPa. As a result, the supercritical carbon dioxide has its volume expanded by a factor of ca. 2.5 to drive the turbine 20, after which it is discharged from the turbine 20.

Thus, the supercritical carbon dioxide, driving the turbine 20, has an expansion ratio of ca. 2.5 between the volume at the turbine inlet side and that at the turbine outlet side. It is thus unnecessary to provide a large-sized outlet for the supercritical carbon dioxide, as would be necessary in the case of using water as the secondary coolant, thus enabling the size of the turbine 20 to be reduced.

The supercritical carbon dioxide, injected into the inside of the turbine 20 to drive it and decompressed/cooled, is delivered to the inside of the recycling heat exchanger 24 so as to be then delivered via the recycling heat exchanger 24 to the cooler 22. It is observed that the supercritical carbon dioxide is delivered from the recycling heat exchanger 24 to the cooler 22 by the pump for circulation 25.

The supercritical carbon dioxide, delivered to the cooler 22, flows through the inside of a heat transfer tube 26 in the cooler 22 so as to be cooled to near the critical point by heat exchange with the coolant water flowing through the cooler 22. It is observed that the supercritical carbon dioxide, delivered to the cooler 22, is maintained at a pressure of 8.5 to 10 MPa. The cooler 22 cools the supercritical carbon dioxide, maintained at the pressure of 8.5 to 10 MPa, to ca. 35° C. which is near the critical point.

The supercritical carbon dioxide, cooled to near the critical point by the cooler 22, is delivered to the compressor 23 so as to be compressed to 12 to 20 MPa.

It is observed that, with the supercritical carbon dioxide at near the critical point, as compared to the carbon dioxide, which is at a temperature or pressure not higher than the critical points, the amount of the work needed to achieve the same compression ratio may be drastically reduced. It is thus possible to reduce the amount of the work of the compressor 23 in compressing the supercritical carbon dioxide. According to the present invention, the compressor 23 is driven by the turbine 20 that actuates the generator 21, so that it is possible to relatively increase the energy used in driving the generator 21, as a result of which the ratio of the energy of the turbine 20 in driving the generator 21 may be increased to improve the power generation efficiency.

On the other hand, the supercritical carbon dioxide, compressed by the compressor 23, is delivered to the heat transfer tube 29 within the recycling heat exchanger 24 and heat-exchanged with the supercritical carbon dioxide. This supercritical carbon dioxide has been ejected from the turbine 20 so as to be delivered into the inside of the recycling heat exchanger 24 at the temperature of ca. 350 to 500° C. Hence, the supercritical carbon dioxide is preliminarily heated to ca. 250 to 350° C. by such heat exchange. The supercritical carbon dioxide, thus preliminarily heated, is again returned to the main heat exchanger 15 and heated by heat exchange with metal sodium which is the primary coolant heated by the nuclear reactor 3.

Thus, in the compact nuclear power generation system, according to the present invention, the supercritical carbon dioxide, used for driving the turbine 20, is cooled, compressed, pre-heated and ultimately heated to drive the turbine 20 to actuate the generator 21, so that it becomes possible to construct a high efficiency power generation system.

Furthermore the nuclear reactor, driving the power generation system, is constructed using a reactor vessel with a diameter not larger than 2 m and a height not larger than 12 m. Hence, the nuclear reactor may be constructed as a compact apparatus, so that the nuclear power generation system, including the nuclear reactor, may be reduced in size.

It is observed that, in the subject embodiment, there is provided an isolation valve 31 halfway on a flow channel through which supercritical carbon dioxide flows from the main heat exchanger 15 to the turbine 20, while there is provided another isolation valve 32 halfway on a flow channel through which supercritical carbon dioxide flows from the turbine 20 to the recycling heat exchanger 24. By providing the isolation valves 31, 32, it is possible to shut off the flow of supercritical carbon dioxide towards the nuclear system side to isolate the turbine 20 from the nuclear reactor 3, so that maintenance as well as inspection of the power generation system inclusive of the turbine 20 may be accomplished safely and easily.

Moreover, the present invention may usefully be applied to a nuclear power generation system which performs the load follower operation in which the power generation system is driven as the reactivity of the fuel in the nuclear reactor 3 is automatically controlled so as to follow variations in power consumption by the load connected to the system.

According to the present invention, metal sodium is used as the primary coolant for the nuclear reactor. If the fuel reactivity is raised such as to increase the power generation output so as to follow the increasing power consumption by the load connected to the power generation system, the density of metal sodium is lower, while its temperature becomes higher. The degree of leakage of the neutron number generated by the fuel reaction will increase to automatically lower the fuel reactivity. If conversely the power generation output of the power generation system is lowered, the density of metal sodium becomes higher, while its temperature becomes lower. The degree of leakage of the neutron number generated by the fuel reaction becomes lower, thus automatically elevating the fuel reactivity. Thus, with the use of metal sodium as the primary coolant, it becomes possible to automatically control the nuclear fuel reactivity so as to follow variations in the power consumption by the load connected to the power generation system. Hence, the present invention may be applied to the nuclear power generation system performing the load follower operation without using control rods.

Figure 4:
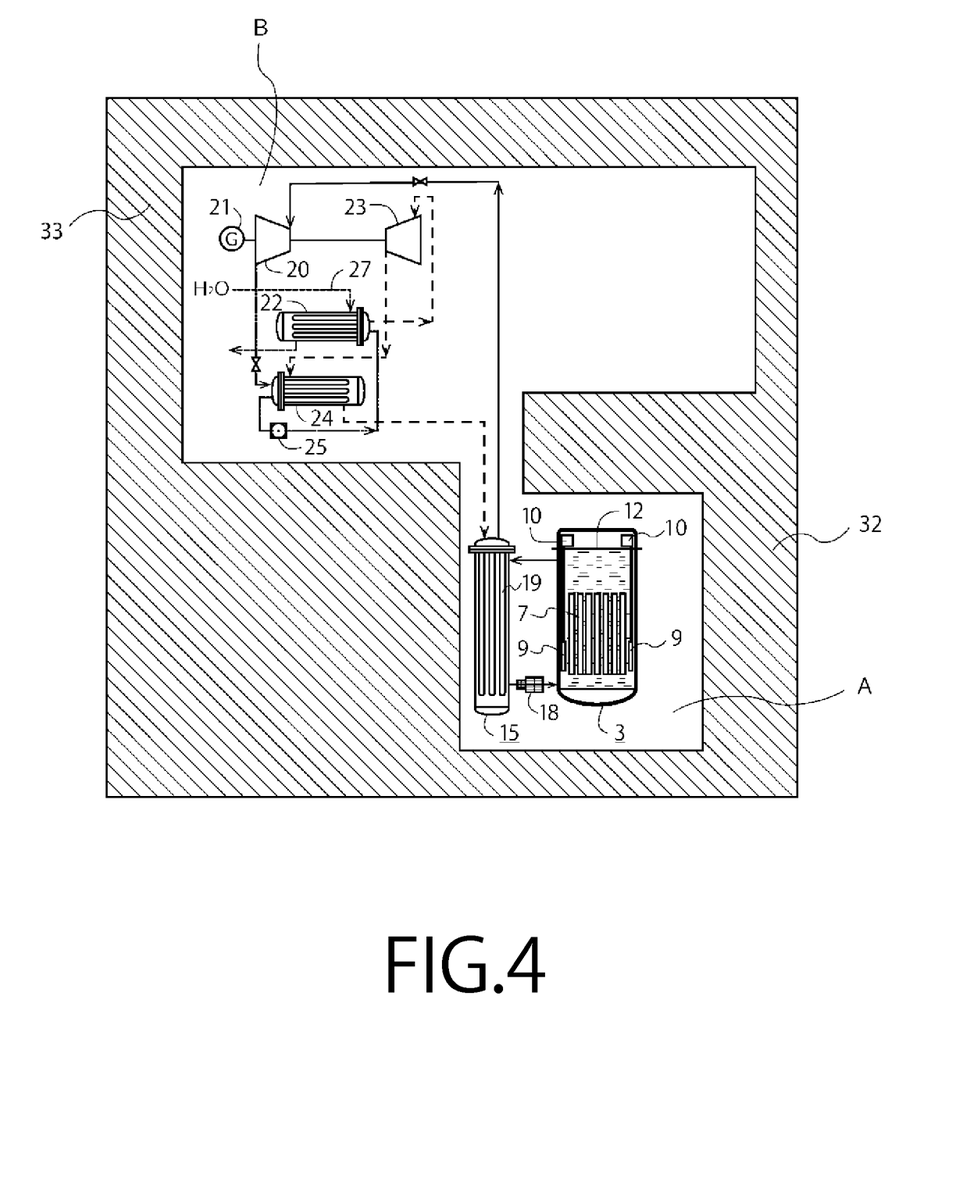
FIG. 4 is a schematic view showing an example installation of the compact nuclear power generation system according to the present invention.

Furthermore, in the compact nuclear power generation system, according to the present invention, a system A and a power generation system B are simply correlated to each other by a conduit system through which flows the supercritical carbon dioxide. The system A includes the nuclear reactor 3 and the main heat exchanger 15 as well as the equipment controlling the operation of the nuclear reactor 3, the system B including the turbine 20 and the generator 21 run in operation by the turbine 20. The turbine is driven by the supercritical carbon dioxide heated by heat exchange with the main heat exchanger 15. The two systems may thus be installed as systems isolated and independent from each other.

Hence, the system A, comprised of the nuclear reactor and neighbored equipment, is installed in, for example an underground concrete building 32, while the power generation system B is installed in a building 33 on the ground. By providing the systems A and B in isolation from each other, in this manner, it is possible to reduce radiation exposure to assure safety as well as maintenance and inspection of the power generation system B inclusive of the turbine 20.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

SYMBOLS

1 reactor vessel
2 reactor core
3 nuclear reactor
8 primary coolant
9 neutron reflector
10 rotary driving mechanism
11 driving shaft
15 main heat exchanger
16, 17 conduits
20 turbine
21 generator
22 cooler
23 compressor
24 recycling heat exchanger
25 pump for circulation

What is claimed is:

1. A compact nuclear power generation system comprising:
   a nuclear reactor comprising a reactor core provided with a plurality of fuel assemblies each formed by a plurality of fuel rods bundled together to form a unified structure, each fuel rod being formed by a metal fuel sealed in a sheathing tube, and the metal fuel being formed of either (i) an alloy composed of zirconium, uranium-235, uranium-238, and plutonium-239; or (ii) an alloy composed of zirconium, uranium-235, and uranium-238;
   a reactor vessel that houses therein the reactor core;
   a primary coolant charged into the reactor vessel and formed of metal sodium that is varied in temperature and in density depending on reactivity of the metal fuel to automatically control reactivity of the metal fuel;
   a neutron reflector provided around the outer periphery of the reactor core and operating to reflect neutrons radiated from the metal fuel in the reactor core back towards the metal fuel so as to maintain the effective multiplication factor for neutrons radiated from the metal fuel at approximately unity or higher to maintain the critical state of the metal fuel, the neutron reflector having a height not larger than one-half of the height of the fuel rods and being carried for movement in the height-wise direction of the fuel rods, and the neutron reflector being moved by a movement mechanism;
   the movement mechanism configured to move the neutron reflector in the height-wise direction of the fuel rods, and the movement mechanism is configured to move the neutron reflector from a lower part towards an upper part of the reactor core, as the neutron reflector faces the fuel rods of the reactor core, so as to set the metal fuel progressively to the critical state from the lower part towards the upper part;
   a main heat exchanger installed outside the nuclear reactor vessel and supplied via a conduit with the primary coolant heated by the nuclear reactor;
   a secondary coolant formed of supercritical carbon dioxide being circulated within the main heat exchanger so as to be heated by heat exchange with the primary coolant;
   a turbine driven by the secondary coolant heated by the main heat exchanger; and
   a generator configured to operate responsive to the turbine being driven.

2. The compact nuclear power generation system according to claim 1, wherein the movement mechanism that causes movement of the neutron reflector includes a rotary driving shaft carrying the neutron reflector for movement in an up-and-down direction and a rotary driving mechanism that causes rotation of the rotary driving shaft.

3. The compact nuclear power generation system according to claim 1, wherein the sheathing tube is formed of ferrite-based stainless steel or chromium molybdenum steel.

4. The compact nuclear power generation system according to claim 1, wherein the reactor vessel is formed as a cylinder having a diameter not larger than 2 m and a height not larger than 12 m, and the reactor core housed within the reactor vessel is formed by a plurality of fuel rods each having a diameter of 5 to 15 mm and a length not larger than 2.5 m.

5. The compact nuclear power generation system according to claim 1, further comprising:
   a pump that causes circulation of the primary coolant, the pump or the circulation caused by the pump charging the primary coolant into the reactor vessel, from the reactor vessel to the main heat exchanger.

6. The compact nuclear power generation system according to claim 1, further comprising:
   a cooler that cools the secondary coolant that has driven the turbine and that has been discharged from the turbine;
   a compressor that compresses the secondary coolant cooled by the cooler; and
   a recycling heat exchanger supplied with the secondary coolant discharged from the turbine and with the secondary coolant compressed by the compressor; the recycling heat exchanger heating the secondary coolant compressed by the compressor by the secondary coolant supplied from the turbine to return the heated secondary coolant to the main heat exchanger.

7. The compact nuclear power generation system according to claim 6, wherein, the compressor is driven by the turbine.

* * * * *